(12) United States Patent
Bhavaraju et al.

(10) Patent No.: US 9,537,179 B2
(45) Date of Patent: Jan. 3, 2017

(54) INTERMEDIATE TEMPERATURE SODIUM-METAL HALIDE BATTERY

(71) Applicant: CERAMATEC, INC., Salt Lake City, UT (US)

(72) Inventors: Sai Bhavaraju, West Jordan, UT (US); Ashok V. Joshi, Salt Lake City, UT (US); Mathew Robins, Saratoga Springs, UT (US); Alexis Eccleston, Salt Lake City, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 531 days.

(21) Appl. No.: 14/496,509

(22) Filed: Sep. 25, 2014

(65) Prior Publication Data

US 2015/0086826 A1  Mar. 26, 2015

Related U.S. Application Data

(60) Provisional application No. 61/882,516, filed on Sep. 25, 2013, provisional application No. 61/891,744, (Continued)

(51) Int. Cl.
*H01M 4/24* (2006.01)
*H01M 10/39* (2006.01)
(Continued)

(52) U.S. Cl.
CPC ........... *H01M 10/399* (2013.01); *H01M 4/381* (2013.01); *H01M 4/582* (2013.01); *H01M 2300/0074* (2013.01)

(58) Field of Classification Search
CPC ............ H01M 8/04291; H01M 8/04097; H01M 8/04141; H01M 8/04149; H01M 2250/20; B60L 11/18; B01D 63/02; Y02E 60/50
See application file for complete search history.

(56) References Cited

U.S. PATENT DOCUMENTS 3,847,667 A  11/1974  Werth
4,335,191 A   6/1982  Peled
(Continued)

FOREIGN PATENT DOCUMENTS

EP  2490293    8/2012
JP  08321322   12/1996
(Continued)

OTHER PUBLICATIONS

Shin, Ju C., "International Search Report", PCT Application No. PCT/US2014/054339 (Corresponding to U.S. Appl. No. 14/478,676), (Dec. 15, 2014), 1-3.
(Continued)

*Primary Examiner* — Cynthia K Walls
(74) *Attorney, Agent, or Firm* — Paul S. Cha

(57) ABSTRACT

An intermediate temperature molten sodium-metal halide rechargeable battery utilizes a molten eutectic mixture of sodium haloaluminate salts having a relatively low melting point that enables the battery to operate at substantially lower temperature compared to the traditional ZEBRA battery system and utilize a highly conductive NaSICON solid electrolyte membrane. The positive electrode comprises a mixture of NaX and MX, where X is a halogen selected from Cl, Br and I and M is a metal selected Ni, Fe, and Zn. The positive electrode is disposed in a mixed molten salt positive electrolyte comprising at least two salts that can be represented by the formula $NaAlX'_{4-\delta}X''_\delta$, where $0<\delta<4$, wherein X' and X" are different halogens selected from Cl, Br and I. The positive electrode may include additional NaX added in a molar ratio ranging from 1:1 to 3:1 of $NaX:NaAlX'_{4-\delta}X''_\delta$.

20 Claims, 4 Drawing Sheets

Related U.S. Application Data filed on Oct. 16, 2013, provisional application No. 61/898,617, filed on Nov. 1, 2013.

(51) Int. Cl.
*H01M 4/38* (2006.01)
*H01M 4/58* (2010.01)

(56) References Cited

U.S. PATENT DOCUMENTS

| | | | |
|---|---|---|---|
| 4,894,298 | A | 1/1990 | Vukson et al. |
| 5,019,466 | A | 5/1991 | Coetzer et al. |
| 5,053,294 | A | 10/1991 | Sernka et al. |
| 6,007,943 | A | 12/1999 | Coetzer |
| 6,187,479 | B1 | 2/2001 | Liu |
| 2005/0260460 | A1 | 11/2005 | Kishi et al. |
| 2006/0141346 | A1 | 6/2006 | Gordon et al. |
| 2008/0268327 | A1 | 10/2008 | Gordon et al. |
| 2009/0134842 | A1 | 5/2009 | Joshi et al. |
| 2010/0279174 | A1 | 11/2010 | Young |
| 2010/0297537 | A1 | 11/2010 | Coors et al. |
| 2011/0104526 | A1 | 5/2011 | Boxley et al. |
| 2011/0199042 | A1 | 8/2011 | Abe |
| 2011/0223460 | A1 | 9/2011 | Farmer |
| 2012/0021273 | A1 | 1/2012 | Ohmori et al. |
| 2012/0219833 | A1 | 8/2012 | Coors et al. |
| 2014/0210422 | A1 | 7/2014 | Bhavaraju et al. |
| 2014/0212707 | A1 | 7/2014 | Bhavaraju et al. |

FOREIGN PATENT DOCUMENTS

| | | |
|---|---|---|
| JP | 2004178991 | 6/2004 |
| JP | 2009009933 | 1/2009 |
| KR | 20100027321 | 3/2010 |
| KR | 20130098236 | 9/2013 |
| WO | WO2010110465 | 9/2010 |
| WO | WO2010135283 | 11/2010 |
| WO | WO2012114951 | 8/2012 |
| WO | WO2012117916 | 9/2012 |
| WO | WO2012132813 | 10/2014 |

OTHER PUBLICATIONS

Shin, Ju C., "Written Opinion of the International Searching Authority", PCT Application No. PCT/US2014/054339 (Corresponding to U.S. Appl. No. 14/478,676), (Dec. 15, 2014), 1-3.

Yuki, Saori "Japanese Office Action", Japanese App No. JP2013-537914, (Sep. 8, 2015), 1-8.

Motohiro, Fukuhara "English Language Abstract", KR20100027321, (Mar. 11, 2010), 1.

Soo, et al., "English Language Abstract", KR20130098236, (Sep. 4, 2013), 1.

Eoff, Anca "Non-Final Office Action", U.S. Appl. No. 14/298,302, (Nov. 18, 2015), 1-19.

Barcena, Carlos "Non Final Office Action", U.S. Appl. No. 14/292,130, (Dec. 8, 2015), 1-9.

Cho, Ki Y., "International Search Report", PCT application US2011/059624.(Corresponding to U.S. Appl. No. 13/290,716), (May 22, 2012),1-3.

Cho, Ki Y., "Written Opinion of the International Searching Authority", PCT application US2011/059624 (Corresponding to U.S. Appl. No. 13/290,716), (May 22, 2012),1-3.

Totsuka, KazuhIde "Patent Abstracts of Japan (JP 08-321322)", English Language Abstract of Japanese patent publication JP JP 08-321322, (Dec. 3, 1996),1.

Bito, et al., "Bibliographical Data and Abstract of JP2004178991", Japanese Published Patent Application JP 2004178991, (Jun. 24, 2004),1.

Wang, et al., "Room temperature Na/S batteries with sulfur composite Cathode Material", *Electrochemistry Communications 9 (2007), Elsevier*, (Jun. 18, 2006),31-34.

Shin, Ju C., "International Search Report", PCT Application No. PCT/US14/41329 (Corresponding to U.S. Appl. No. 14/298,302;), (Oct. 2, 2014),1-3.

Shin, Ju C., "Written Opinion of the International Searching Authority", PCT Application No. PCT/US14/41329 (Corresponding to U.S. Appl. No. 14/298,302;, (Oct. 2, 2014),1-6.

Kim, et al., "The Role of Additives in the Electroreduction of Sodium Ions in Chloroaluminate-Based Ionic Liquids", *Journal of the Electrochemical Society*, 2005, vol. 152, No. 1, pp. E9-E13, (Dec. 1, 2004),E9-E13.

Lang, et al., "Catalytic additivies for the reversible reduction of sodium in chloroaluminate ionic liquids", *Electrochimica Acta*, 2006, vol. 51, Iss. 19, pp. 3884-3889, (Dec. 27, 2005),3884-3889.

Choi, Sang W., "International Search Report", PCT Application No.PCT/US2014/0423698 (Corresponding to U.S. Appl. No. 14/205,019;), (Jul. 29, 2014),1-3.

Choi, Sang W., "Written Opinion of the International Searching Authority", PCT Application No. PCT/US2014/0423698 (Corresponding to U.S. Appl. No. 14/205,019;), (Jul. 29, 2014),1-6.

Shin, Ju C., "International Search Report", PCT Application No.PCT/US2014/40297 (Corresponding to U.S. Appl. No. 14/292,130;), (Sep. 25, 2014),1-3.

Shin, Ju C., "Written Opinion of the International Searching Authority", PCT Application No. PCT/US2014/40297 (Corresponding to U.S. Appl. No. 14/292,130;), (Sep. 25, 2014),1-6.

Shozo, Fujiwara "English Language Abstract", JP2009009933, (Jan. 15, 2009),1.

Cho, Han S., "International Search Report", PCT Application No. PCT/US14/57462 (Corresponding to U.S. Appl. No. 14/496,509), (Jan. 9, 2015),1-3.

Cho, Han S., "Written Opinion of the International Searching Authority", PCT Application No. PCT/US14/57462 (Corresponding to U.S. Appl. No. 14/496,509), (Jan. 9, 2015),1-4.

Shin, Ju C., "International Search Report", PCT Application No. PCT/US2014/024066 (Corresponding to U.S. Appl. No. 14/205,772;), (Jun. 27, 2014),1-3.

Shin, Ju C., "Written Opinion of the International Searching Authority", PCT Application No. PCT/US2014/024066 (Corresponding to U.S. Appl. No. 14/205,772;), (Jun. 27, 2014),1-6.

Li, et al., "Rechargeable Ni—Li Battery Integrated Aqueous/Non Aqueous System", *Energy Technology Research Institute, National Institute of Advanced Industrial Science and Technology*, (Oct. 5, 2009),15098-15099.

Carrico, Robert S., "Non-Final Office Action", U.S. Appl. No. 13/290,716, (Jul. 22, 2014),1-15.

Carrico, Robert S., "Notice of Allowance", U.S. Appl. No. 13/290,716, (Oct. 29, 2014),1-8.

Hueso, et al., "High Temperature Sodium Batteries: Status, challenges and future trends", *Energy & Environmental Science*, 2013, 6, 734-749, (Jan. 14, 2013),734-749.

Sudworth, J.L. "The sodium/nickel chloride (ZEBRA) battery", *Journal of Power Sources 100* (2001) 149-163, (Jan. 1, 2001),149-163.

INTERMEDIATE TEMPERATURE SODIUM-METAL HALIDE BATTERY

CROSS-REFERENCE TO RELATED APPLICATION

This application claims the benefit of U.S. Provisional Patent Application No. 61/882,516, filed Sep. 25, 2013, entitled INTERMEDIATE TEMPERATURE SODIUM-NICKEL HALIDE BATTERY; U.S. Provisional Patent Application No. 61/891,744, filed Oct. 16, 2013, entitled INTERMEDIATE TEMPERATURE SODIUM-NICKEL HALIDE BATTERY; and U.S. Provisional Patent Application No. 61/898,617, filed Nov. 1, 2013, entitled INTERMEDIATE TEMPERATURE SODIUM-METAL HALIDE BATTERY. The foregoing applications are incorporated by reference.

FIELD OF THE INVENTION

The disclosed invention relates to an intermediate temperature, molten sodium-metal halide battery. More specifically, the invention relates to a molten sodium, metal halide battery comparable to the traditional sodium/metal chloride ZEBRA battery system but utilizing a molten eutectic mixture of sodium haloaluminate salts having a relatively low melting point that enables the battery to operate at substantially lower temperature compared to the traditional ZEBRA battery system.

BACKGROUND OF THE INVENTION

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on sodium can comprise a variety of materials and designs, most, if not all, sodium batteries requiring a high Faradaic efficiency employ a solid primary electrolyte separator, such as a solid ceramic primary electrolyte membrane. The principal advantage of using a solid ceramic primary electrolyte membrane is that the Faradaic efficiency of the resulting cell approaches 100%. Indeed, in almost all other cell designs electrode solutions in the cell are able to intermix over time and, thereby, cause a drop in Faradaic efficiency and loss of battery capacity.

The primary electrolyte separators used in sodium batteries that require a high Faradaic efficiency often consist of ionically conducting polymers, porous materials infiltrated with ionically conducting liquids or gels, or dense ceramics. In this regard, most, if not all, rechargeable sodium batteries that are presently available for commercial applications comprise a molten sodium metal negative electrode, a sodium $\beta''$-alumina ceramic electrolyte separator, and a molten positive electrode. One known molten positive electrode is molten $NiCl_2$, $NaCl$, and $NaAlCl_4$, commonly called a ZEBRA cell. The ZEBRA cell normally operates in a temperature range from 270° C. to 350° C. Another known molten positive electrode is a composite of molten sulfur and carbon, commonly called a sodium/sulfur cell.

Because these conventional high temperature sodium-based rechargeable batteries have relatively high specific energy densities and only modest power densities, such rechargeable batteries are typically used in certain specialized applications that require high specific energy densities where high power densities are typically not encountered, such as in stationary storage and uninterruptable power supplies.

Despite the beneficial characteristics associated with some conventional sodium-based rechargeable batteries, such batteries may have significant shortcomings. In one example, because the sodium $\beta''$-alumina ceramic electrolyte separator is typically more conductive and is better wetted by molten sodium at a temperature in excess of about 270° C. and/or because the molten positive electrode typically requires relatively high temperatures (e.g., temperatures above about 180° C.) to remain molten, many conventional sodium-based rechargeable batteries operate at temperatures higher than about 270° C. and are subject to significant thermal management problems and thermal sealing issues. For example, some sodium-based rechargeable batteries may have difficulty dissipating heat from the batteries or maintaining the negative electrode and the positive electrode at the relatively high operating temperatures. In another example, the relatively high operating temperatures of some sodium-based batteries can create significant safety issues. In still another example, the relatively high operating temperatures of some sodium-based batteries require their components to be resistant to, and operable at, such high temperatures. Accordingly, such components can be relatively expensive. In yet another example, because it may require a relatively large amount of energy to heat some conventional sodium-based batteries to the relatively high operating temperatures, such batteries can be expensive to operate and energy inefficient.

Thus, while molten sodium-based rechargeable batteries are available, challenges with such batteries also exist, including those previously mentioned. Accordingly, it would be an improvement in the art to augment or even replace certain conventional high temperature molten sodium-based rechargeable batteries with other molten sodium-based rechargeable batteries operable at temperatures below about 220° C., and more preferably below about 180° C.

BRIEF SUMMARY OF THE INVENTION

The presently disclosed invention relates to an intermediate temperature, molten sodium-metal halide rechargeable battery. The disclosed molten sodium-metal halide battery is comparable to the traditional sodium-metal chloride ZEBRA battery system, but the disclosed battery utilizes a molten eutectic mixture of sodium haloaluminate salts having a relatively low melting point that enables the battery to operate at substantially lower temperature compared to the traditional ZEBRA battery system.

In one non-limiting embodiment of the disclosed invention, the rechargeable sodium battery includes a negative electrode comprising metallic sodium in molten state. The positive electrode comprises a mixture of NaX and MX, where X is a halogen selected from Cl, Br and I and M is a metal selected Ni, Fe, and Zn. The positive electrode is disposed in a mixed molten salt positive electrolyte comprising at least two salts that can be represented by the formula $NaAlX'_{4-\delta}X''_{\delta}$, where $0<\delta<4$, wherein X' and X" are different halogens selected from Cl, Br and I. A sodium ion conductive solid electrolyte separates the negative electrode and the positive electrode.

The mixed molten salt positive electrolyte comprises at least two salts of the general formula $NaAlX'_4$ and $NaAlX''_4$ at various molar ratios, wherein X' and X" are different halogens selected from Cl, Br and I. In one non-limiting embodiment, the molar ratio of $NaAlX'_4$ to $NaAlX''_4$ is in the range of 9:1 to 1:9 with corresponding $\delta$ values of 0.4 to 3.6.

The positive electrode comprises additional NaX or a mixture of NaX compounds added in a molar ratio to the mixed molten salt positive electrolyte ranging from 1:1 to 3:1 of $NaX:NaAlX'_{4-\delta}X''_{\delta}$. The excess NaX renders the positive electrolyte highly basic. At cell operating temperatures, the positive electrode and mixed molten salt positive electrolyte is a molten liquid or a two phase mixture wherein the mixed molten salt positive electrolyte is predominantly a liquid phase and the additional NaX or mixture of NaX compounds is a solid phase.

In one non-limiting embodiment, the molten salt positive electrolyte comprises $NaAlBr_{2.8}I_{1.2}$.

In one non-limiting embodiment, the NaX comprises NaBr.

In a non-limiting embodiment, the MX comprises NiBr.

In a non-limiting embodiment, the molten salt positive electrolyte comprises $NaAlBr_{2.8}I_{1.2}$, the NaX comprises NaBr, and the MX comprises NiBr.

In a non-limiting embodiment, the sodium ion conductive solid electrolyte comprises a NaSICON electrolyte material. The NaSICON electrolyte material has high sodium conductivity at cell operating temperatures.

In one non-limiting embodiment, the battery operates at a temperature in the range from 160° C. to 220° C.

In one non-limiting embodiment of the disclosed invention, the rechargeable sodium battery includes a negative electrode comprising metallic sodium in molten state. The positive electrode comprises a mixture of NaX and MX, where X is a halogen selected from Cl, Br and I and M is a metal selected Ni, Fe, and Zn. The positive electrode is disposed in a mixed molten salt positive electrolyte comprising at least three salts that can be represented by the formula $NaAlX'_{4-\delta-\overline{\omega}}X''_{\delta}X'''_{\overline{\omega}}$, where X', X" and X''' are three different halogens selected from Cl, Br, and I, where $0<\delta<4$, $0<\overline{\omega}<4$, and $0<\delta+\overline{\omega}<4$. A sodium ion conductive solid electrolyte separates the negative electrode and the positive electrode.

The mixed molten salt positive electrolyte comprises $NaAlCl_4$, $NaAlBr_4$, and $NaAlI_4$, at various molar ratios.

The positive electrode comprises additional NaX or a mixture of NaX compounds added in a molar ratio to the mixed molten salt positive electrolyte ranging from 1:1 to 3:1 of $NaX:NaAlX'_{4-\delta-\overline{\omega}}X''_{\delta}X'''_{\overline{\omega}}$. The excess NaX renders the positive electrolyte highly basic. At cell operating temperatures, the positive electrode and mixed molten salt positive electrolyte is a molten liquid or a two phase mixture wherein the mixed molten salt positive electrolyte is predominantly a liquid phase and the additional NaX or mixture of NaX compounds is a solid phase.

In one non-limiting embodiment, the NaX comprises NaBr.

In a non-limiting embodiment, the MX comprises NiBr.

In a non-limiting embodiment, the sodium ion conductive solid electrolyte comprises a NaSICON electrolyte material. The NaSICON electrolyte material has high sodium conductivity at cell operating temperatures.

In one non-limiting embodiment, the battery operates at a temperature in the range from 160° C. to 220° C.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
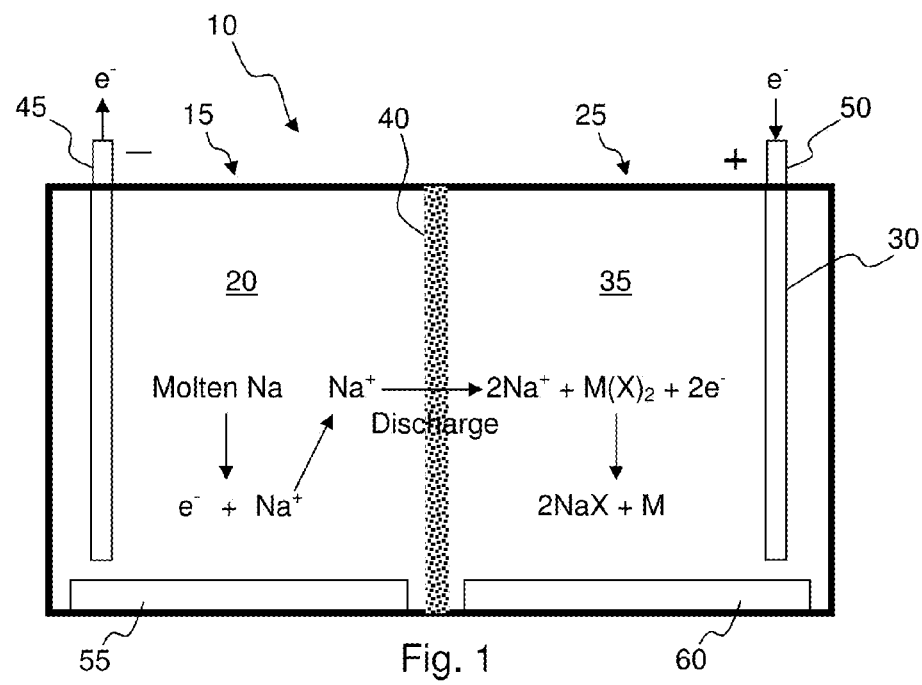
FIG. 1 depicts a schematic diagram of a representative embodiment of a molten sodium secondary cell, wherein the cell is in the process of being discharged.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium negative electrodes, positive electrode materials, liquid positive electrolyte solutions, sodium ion conductive electrolyte membrane, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

The disclosed invention relates to sodium/metal halide molten salt electrolyte batteries that operate at relatively lower temperatures (<220° C.) compared to traditional sodium/metal chloride ZEBRA battery systems that operate at higher temperatures (>280° C.). The disclosed sodium/metal halide battery uses a negative electrode composed of liquid sodium, a NaSICON solid electrolyte membrane to separate the negative electrode from the positive electrode, positive electrode composed of an insoluble transition metal halide, preferably a metal bromide ($NiBr_2$ or $FeBr_2$ or $ZnBr_2$ or a mix of such bromides). Another major difference between the disclosed battery and the traditional ZEBRA battery system is, unlike sodium/metal chloride cells that include a secondary electrolyte of molten sodium tetrachloroaluminate ($NaAlCl_4$) in the positive electrode section, the presently disclosed invention uses a molten eutectic mixture of sodium haloaluminate salts.

The sodium haloaluminate salts are selected from sodium chloroaluminate ($NaAlCl_4$), sodium tetrabromoaluminate ($NaAlBr_4$), and sodium tetraiodoaluminate ($NaAlI_4$). For designation purposes, the formula of a two compound eutectic mixture disclosed herein can be represented as $NaAlX'_{4-\delta}X''_{\delta}$, where X' and X'' are two different halogens selected from Cl, Br, and I, and $0<\delta<4$. For designation purposes, the formula of a three compound eutectic mixture disclosed herein can be represented as $NaAlX'_{4-\delta-\overline{\omega}}X''_{\delta}X'''_{\overline{\omega}}$, where X', X'' and X''' are three different halogens selected from Cl, Br, and I, where $0<\delta<4$, $0<\overline{\omega}<4$, and $0<\delta+\overline{\omega}<4$.

The sodium haloaluminate salts disclosed herein may be represented as a ratio of sodium halide and aluminum trihalide as follows:

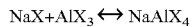

$$NaX + AlX_3 \longleftrightarrow NaAlX_4$$

Where X is a halogen selected from Cl, Br, and I.

When the ratio of $NaX:AlX_3$ is 1:1, then the sodium haloaluminate is considered "neutral". When excess $AlX_3$ is present, then the mixture is considered "acidic". When excess NaX is present, then the mixture is considered "basic".

One advantage of using a metal halide, such as nickel bromide, positive electrode in the presently disclosed invention is the ability to cycle for longer periods due to mitigation of dendrites observed with the metal (nickel) chloride system at temperatures <200° C. Also the utilization of NaSICON membrane, discussed below, which has better low temperature (<200° C.) conductivity than β"-alumina allows achievement of practical current/voltage behavior of the sodium-nickel bromide battery of the disclosed invention.

The disclosed invention provides a molten sodium-metal halide secondary cell that functions at an operating temperature between about 100° C. and about 250° C. While the described cell can comprise any suitable component, FIG. 1 shows a representative embodiment in which the molten sodium secondary cell 10 comprises a negative electrode compartment 15 that includes a sodium metal negative electrode 20 and a positive electrode compartment 25 that comprises a positive electrode. The positive electrode includes a current collector 30 and a metal selected from Ni, Zn, and Fe disposed in a positive electrolyte 35 comprising a molten eutectic mixture of sodium haloaluminate salts ($NaAlCl_4$, $NaAlBr_4$, and $NaAlI_4$). A sodium ion conductive electrolyte membrane 40 separates the negative electrode from the positive electrode and positive electrolyte 35. The sodium ion conductive electrolyte membrane 40 separates a first terminal 45 from a second terminal 50. To provide a better understanding of the described cell 10, a brief description of how the cell functions is provided below. Following this discussion, each of the cell's components shown in FIG. 1 is discussed in more detail.

Turning now to the manner in which the molten sodium secondary cell 10 functions, the cell can function in virtually any suitable manner. In one example, FIG. 1 illustrates that as the cell 10 is discharged and electrons (e⁻) flow from the negative electrode 20 (e.g., via the first terminal 45), sodium is oxidized from the negative electrode 20 to form sodium ions (Na⁺). FIG. 1 shows that these sodium ions are respectively transported from the sodium negative electrode 20, through the sodium ion conductive membrane 40, and to the positive electrolyte 35.

Figure 2:
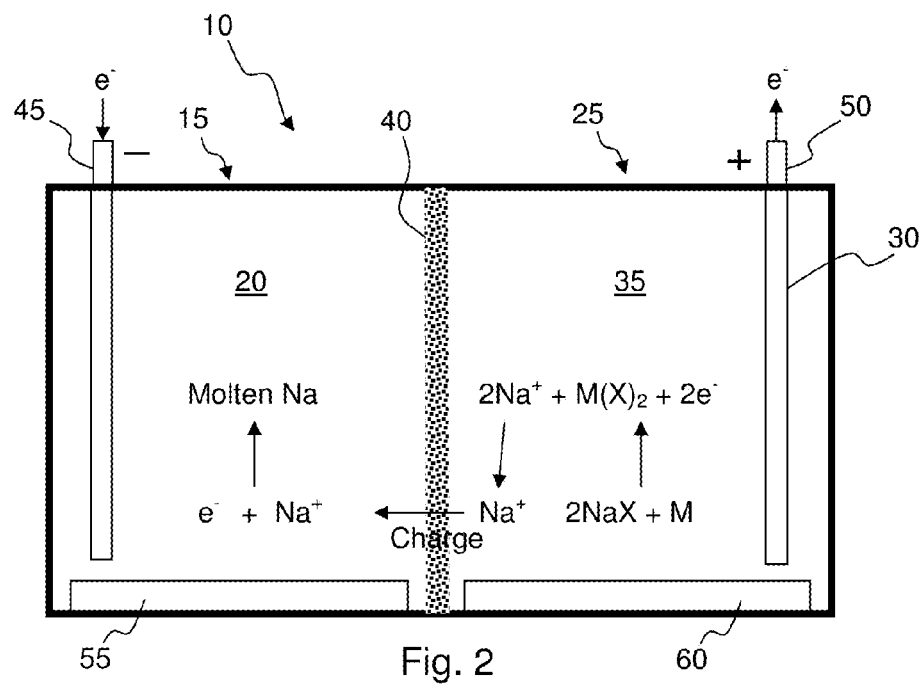
FIG. 2 depicts a schematic diagram of a representative embodiment of the molten sodium secondary cell, wherein the cell is in the process of being recharged.

In a contrasting example, FIG. 2 shows that as the secondary cell 10 is recharged and electrons (e⁻) flow into the sodium negative electrode 20 from an external power source (not shown), such as a recharger, the chemical reactions that occurred when the cell 10 was discharged (as shown in FIG. 1) are reversed. Specifically, FIG. 2 shows that as the cell 10 is recharged, sodium ions (Na⁺) are respectively transported from the positive electrolyte 35, through the electrolyte membrane 40, and to the negative electrode 20, where the sodium ions are reduced to form sodium metal (Na).

Referring now to the various components of the cell 10, the cell, as mentioned above, can comprise a negative electrode compartment 15 and a positive electrode compartment 25. In this regard, the two compartments can be any suitable shape and have any other suitable characteristic that allows the cell 10 to function as intended. By way of example, the negative electrode and the positive electrode compartments can be tubular, rectangular, or be any other suitable shape. Furthermore, the two compartments can have any suitable spatial relationship with respect to each other. For instance, while FIG. 2 shows that the negative electrode compartment 15 and the positive electrode compartment 25 can be adjacent to each other, in other embodiments (not shown), one compartment (e.g., the negative electrode compartment) is disposed, at least partially, in the other compartment (e.g., the positive electrode compartment), while the contents of the two compartments remain separated by the electrolyte membrane 40 and any other compartmental walls.

With respect to the negative electrode 20, the cell 10 can comprise any suitable sodium negative electrode 20 that allows the cell 10 to function (e.g., be discharged and recharged) as intended. Some examples of suitable sodium negative electrode materials include, but are not limited to, a sodium sample that is substantially pure and a sodium alloy comprising any other suitable sodium-containing negative electrode material. In certain embodiments, however, the negative electrode comprises or consists of an amount of sodium that is substantially pure. In such embodiments, because the melting point of pure sodium is around 98° C., the sodium negative electrode will become molten above that temperature.

With respect to the positive current collector 30, the positive electrode compartment 25 can comprise any suitable positive electrode that allows the cell to be charged and discharged as intended. For instance, the positive electrode can comprise virtually any current collector 30 in combination with a metal, shown generically as "M" in FIGS. 1 and 2, in a positive electrolyte 35 comprising a molten eutectic mixture of sodium haloaluminate salts. In some non-limiting embodiments, the metal ("M") is selected from Ni, Zn, and Fe. In some non-limiting embodiments, the positive current collector may comprise a wire, felt, plate, tube, mesh, foam, and/or other suitable current collector configuration.

In some non-limiting embodiments, the reactions that may occur at the negative electrode and at the positive electrode and the overall reaction as the cell 10 is discharged may occur as illustrated below:

Negative electrode $2Na \leftrightarrow 2Na^+ + 2e^-$

Positive electrode $M(X)_2 + 2e^- \leftrightarrow M + 2X^-$

Overall $2Na + M(X)_2 \leftrightarrow M + 2NaX$

Where X is a halogen selected from Cl, Br, and I. Moreover, some examples of overall reactions that may occur at the negative electrode and at the positive electrode and the overall reaction as the cell 10 is charged (or recharged) may occur as illustrated below:

Negative electrode $2Na^+ + 2e^- \leftrightarrow 2Na$

Positive electrode $M + 2X^- \leftrightarrow M(X)_2 + 2e^-$

Overall $M + 2NaX \leftrightarrow 2Na + M(X)_2$

While the foregoing reactions show that M has a divalent oxidization state ($M^{2+}$), the positive electrode may comprise a metal having a monovalent, trivalent, tetravalent, or other oxidation state.

The positive electrolyte 35 comprising a molten eutectic mixture of sodium haloaluminate salts has been found to have good sodium ion conductivity that allows the cell 10 to function as intended. It is intended for the positive electrolyte 35 to have a higher sodium ion conductivity than the electrolyte membrane 40. The sodium conductivity of the molten eutectic mixture of sodium haloaluminate salts ranges between about 200 mS/cm and 500 mS/cm. The NaSICON conductivity may range between about 80 and about 220 mS/cm at cell operating temperatures between 150° C. and 200° C.

With regards now to the sodium ion conductive electrolyte membrane 40, the membrane can comprise any suitable material that selectively transports sodium ions and permits the cell 10 to function with the molten sodium negative electrode and the positive electrolyte. In some embodiments, the electrolyte membrane comprises a NaSICON-type (sodium Super Ion CONductive) material. In such embodiments, the NaSICON-type material may comprise any known or novel NaSICON-type material that is suitable for use with the described cell 10. Some non-limiting examples of NaSICON-type compositions include, but are not limited to, $Na_3Zr_2Si_2PO_{12}$, $Na_{1+x}Si_xZr_2P_{3-x}O_{12}$ (where x is selected from 1.6 to 2.4), Y-doped NaSICON ($Na_{1+x+y}Zr_{2-y}Y_y Si_xP_{3-x}O_{12}$, $Na_{1-x}Zr_{2-y}Y_y Si_xO_{12-y}$ (where x=2, y=0.12), and Fe-doped NaSICON ($Na_3Zr_2/_3Fe_4/_3P_3O_{12}$). Indeed, in certain embodiments, the NaSICON-type membrane comprises $Na_3Si_2Zr_2PO_{12}$. In still other embodiments, the NaSICON-type membrane comprises known or novel composite, cermet-supported NaSICON membrane. In such embodiments, the composite NaSICON membrane can comprise any suitable component, including, without limitation, a porous NaSICON-cermet layer that comprises NiO/NaSICON or any other suitable cermet layer, and a dense NaSICON layer. In yet other embodiments, the NaSICON membrane comprises a monoclinic ceramic.

Where the cell's electrolyte membrane 40 comprises a NaSICON-type material, the NaSICON-type material may provide the cell 10 with several beneficial characteristics. In one example, because such membranes selectively transport sodium ions but do not allow the negative electrode 20 and the positive electrolyte 35 to mix, such membranes can help the cell to have minimal capacity fade and to have a relatively stable shelf life at ambient temperatures.

With reference now to the terminals 45 and 50, the cell 10 can comprise any suitable terminals that are capable of electrically connecting the cell with an external circuit, including without limitation, to one or more cells. In this regard, the terminals can comprise any suitable material and any suitable shape of any suitable size.

In addition to the aforementioned components, the cell 10 can optionally comprise any other suitable component. By way of non-limiting illustration FIG. 2 shows an embodiment in which the cell 10 comprises a heat management system 55, 60. Independent heat management systems may be associated with the negative electrode and positive electrode compartments. Alternatively, a single heat management system may be disposed in only one compartment or to the exterior of the cell 10 generally. In such embodiments, the cell can comprise any suitable type of heat management system that is capable of maintaining the cell within a suitable operating temperature range. Some examples of such heat management systems include, but are not limited to, a heater, a cooler, one or more temperature sensors, and appropriate temperature control circuitry.

The described cell 10 may function at any suitable operating temperature. In other words, as the cell is discharged and/or recharged, the sodium negative electrode and the positive electrolyte may have any suitable temperature. The negative and positive electrode compartments may operate at the same or different temperatures. Indeed, in some embodiments, the cell functions at an operating temperature that is as high as a temperature selected from about 260° C., about 240° C., and about 220° C. Moreover, in such embodiments, as the cell functions, the temperature of the negative and/or positive electrode compartments can be as low as a temperature selected from about 160° C., about 170° C., about 180° C., and about 200° C. Indeed, in some embodiments, as the cell functions, the temperature of the negative and/or positive electrode compartments may be between about 160° C. and about 260° C. In other embodiments, the cell functions at a temperature between about 180° C. and about 220° C. In yet other embodiments, however, as the cell functions, the temperature of the negative and/or positive electrode compartments is about 200° C.±about 10° C.

In certain embodiments, the temperature range is dependent upon the melting point of the electrolyte being used.

For example, in one embodiment, the cell may be operated at least 10-20° C. above the melting point of the electrolyte. The electrolytes increase their conductivity as temperature increases so there is not necessarily an upper limit as far as the electrolyte is concerned. In one embodiment, for example, sodium melts at about 98° C. and a NaAlCl3I electrolyte has a melting point of about 85° C. So it is possible to operate a battery at a temperature as low as 100° C.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

Example 1

The construction of the molten sodium-metal bromide secondary cell used in the examples disclosed herein may be as follows: A NaSICON (Na Super Ionic Conductor) solid electrolyte membrane is glass sealed to a glass tube (or alumina tube) and filled with sodium metal (negative electrode) in molten state. A stainless steel or Ni or Mo metal current collector rod is immersed in the sodium metal to provide electrical contact with the negative electrode. The glass tube is placed inside another glass vial equipped with a cap to tightly seal around the tube to hang it and hold it in space within the glass vial.

An insoluble positive electrode is positioned inside the vial opposite to the NaSICON membrane. The insoluble positive electrode is constructed by thoroughly mixing Ni metal particles with NaBr powder followed by pressing into pellets. The porosity of the positive electrode is in the range of 15 to 70% and is preferably in the range of 35 to 55%. A nickel or carbon current collector in the form of a rod, mesh, or other suitable form is used to provide electrical connection with the positive electrode. The theoretical capacity of the positive electrode used in the present example based on the starting amount of NaBr is about 200 mAh. In one embodiment, the starting amount of Ni may be 1.31 g and the starting amount of NaBr may be 0.77 g.

The positive electrode section containing the molten salt electrolyte is separated from the negative electrode section by a NaSICON solid electrolyte membrane of 0.72 cm diameter (active area through which Na ions are conducted) and 0.1 cm thick.

Example 2

Several different mixtures of $NaAlBr_4+NaAlI_4$ (or $NaAlCl_4$) molten salt electrolyte are placed in the vial described in Example 1 such that the positive electrode is immersed inside the electrolyte. This electrolyte serves to conduct sodium ions from the solid electrolyte to the metal bromide reaction sites within the positive electrode. The mixed $NaAlBr_4+NaAlI_4$ (or $NaAlCl_4$) molten salt electrolytes are eutectic type and melt in the temperature range of 150° C.-180° C. depending on the composition of the mix. These melting points are lower than the individual salts as shown in the Table 1, below. Table 1 also shows the melting points of three different mixes with varying ratios of $NaAlBr_4$ and $NaAlI_4$ along with the single compounds. $NaAlBr_4$ rich compositions (compositions 2 or 3) are preferable for the operation of the present battery. Specifically composition 3 corresponding to a composition of $NaAlBr_{2.8}I_{1.2}$ made by mixing 35:35:15:15 of $NaBr:AlBr_3:NaI:AlI_3$ with excess sodium halide (in a 3:1 ratio of NaBr:NaI) shown in row 3 in the table below was used in the operation of the disclosed battery. Specifically, an excess of 0.91 moles of NaBr and 0.39 moles of NaI were added per every mole of $NaAlBr_{2.8}I_{1.2}$ used in the present example.

TABLE 1

| Composition | Melting Pt ° C. |
|---|---|
| 1. $NaAlBr_4$ (50:50 $NaBr:AlBr_3$) | 200 |
| 2. 70:30 $NaAlBr_4:NaAlI_4$ (35:35:15:15 $NaBr:AlBr_3:NaI:AlI_3$)~$NaAlBr_{2.8}I_{1.2}$ | 158 |
| 3. 70:30 $NaAlBr_4:NaAlI_4$ (35:35:15:15 $NaBr:AlBr_3:NaI:AlI_3$) + Excess NaX (at a 3:1 ratio of NaBr:NaI) | Two phase mixture with the liquid phase corresponding $NaAlBr_{2.8}I_{1.2}$ at 158° C. (melting point) and solid sodium bromide and sodium iodide. |
| 4. 70:30 $NaAlBr_3Cl:NaAlI_3Cl$ (50:35:15 $NaCl:AlBr_3:AlI_3$) + Excess NaCl | Two phase mixture with the liquid phase corresponding $NaAlBr_{1.5}I_{1.5}Cl$ at 135° C. (melting point) and solid sodium chloride. |
| 5. 50:50 $NaAlBr_4:NaAlI_4$ (25:25:25:25 $NaBr:AlBr_3:NaI:AlI_3$) | 163 |
| 6. 50:50 $NaBr:AlCl_3$ | 150 |
| 7. 48:52 $NaI:AlCl_3$ | 85 |
| 8. 30:70 $NaAlBr_4:NaAlI_4$ (15:15:35:35 $NaBr:AlBr_3:NaI:AlI_3$) | 178 |
| 9. $NaAlI_4$ (50:50 $NaI:AlI_3$) | 235 |

The purpose of addition of the excess sodium bromide and sodium iodide is five fold:

[1] The solubility of nickel halide should be minimal in the molten salt electrolyte to achieve high rate charge and discharge of the nickel-nickel halide cathode. Super saturation of the electrolyte further decrease the solubility of nickel halide and makes it possible to have the fast solid phase reversible electrode kinetics of Ni to $NiX_2$ ($NiBr_2$ in the present example) conversion during charging/discharging process.

[2] Utilization of a neutral sodium haloaluminate solution (where the ratio of $NaX:AlX_3$ is 1:1 regardless of whether single or mixed halogens are present, e.g. $NaAlBr_{2.8}I_{1.2}$) presents risks in that the solubility of nickel halide goes up substantially in an acidic environment (that is, NaX deficient) as the electrolyte loses sodium during charge process. Although the solution may be neutral to start with, there may be local areas in the electrolyte that becomes acidic. This would lead to loss of capacity of the cathode due to leeching out of sodium halide (NaBr in the present example) from the cathode after its formation. The nickel halide solubility is also higher in the acidic sodium haloaluminate solution. Addition of excess sodium halides to the electrolyte prevents the leeching out of NaBr and $NiBr_2$ from the cathode.

[3] Potential exits that it is possible to increase the capacity of the cathodes by overcharging them. The excess Na halides in the electrolyte allows new nickel halides to be formed in the electrode after overcharging. This helps maintain battery capacity retention of the cathode during prolonged cycling.

[4] The ZEBRA battery utilizes near neutral/slightly basic sodium chloroaluminate catholyte while the disclosed invention utilizes a "highly basic" electrolyte. There may be substantial difference between the liquid phase composition in the neutral electrolyte vs the basic electrolyte with excess salts. It is possible that the difference in liquid phase composition between the two types of electrolytes leads to better performance of the battery. By way of nonlimiting example, a slightly basic electrolyte may include a sodium halide of between about 50.1% and 53%. A highly basic electrolyte may be one where the sodium halide is greater than about 55% (for example 55:45 NaX:AlX3). In one embodiment, excess sodium halide salt at a ratio of 70:30 (NaX:AlX3).

[5] As disclosed in U.S. Publication No. 2014/0170443A1, having excess sodium halide in the electrolyte will offer higher temperature corrosion protection of NaSICON membrane increasing the longevity of the battery operation. The high temperature stability of NaSICON in NaX solutions follows the order NaI>NaBr>NaCl.

Example 3

The electrode reactions in molten sodium-metal bromide secondary cell described in Example 1 during charge/discharge for nickel metallic positive electrodes are as follows:

NiBr$_2$+2Na $\rightarrow$ Ni+2NaBr  E$_0$=2.48 V at about 180° C.

Figure 3:
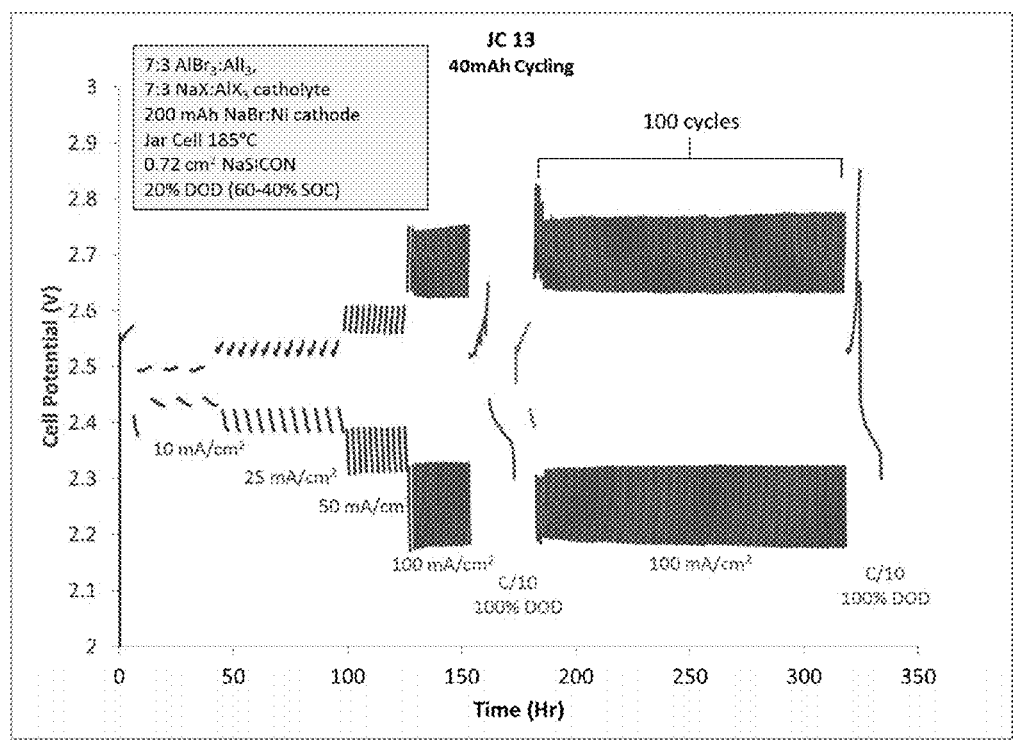
FIG. 3 shows the cycling behavior of a sodium/nickel bromide cell in a positive electrolyte comprising a mixture of 7:3 $NaAlBr_4:NaAlI_4$ (35:35:15:15 $NaBr:AlBr_3:NaAlI_3\sim NaAlBr_{2.8}I_{1.2}$) containing excess NaBr when operated at 185° C.

The cell is constructed in a discharged state where the initial composition of the positive electrode is Ni metal and sodium bromide. The cell contained a positive electrolyte comprising a mixture of 7:3 NaAlBr$_4$:NaAlI$_4$ (35:35:15:15 NaBr:AlBr$_3$:Na~AlI$_3$~NaAlBr$_{2.8}$I$_{1.2}$) containing excess NaBr. FIG. 3 shows the cycling behavior of the cell when operated at 185° C. The cell is first charged at a C/10 rate (based on the 200 mAh capacity of the positive electrode) to a state of charge (SOC) of 60% and then on cycled in the state of charge range of 60 to 40% SOC (20% depth of discharge). The charge-discharge C-rate is progressively increased until the cell is cycling at C/3 rate corresponding to a current density of 100 mA per sq. cm of NaSICON membrane area.

Figure 4:
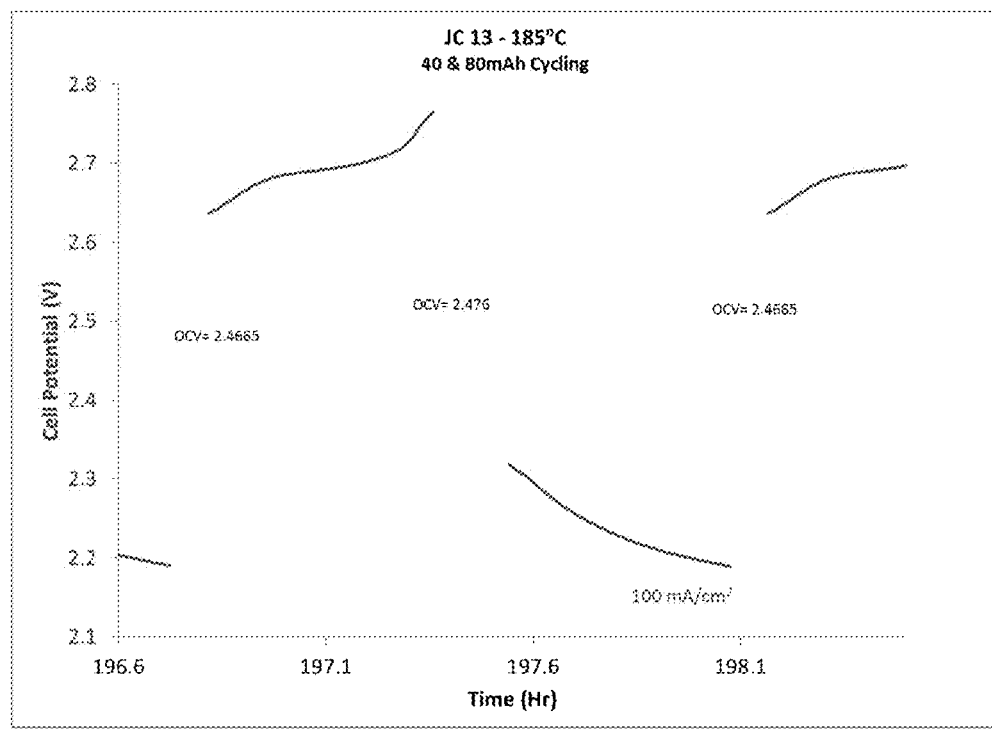
FIG. 4 shows the detail charge/discharge curve for the cell reported in FIG. 3 for the arbitrarily chosen cycle at 196.6 hr.

FIG. 3 shows that the cell was operated at this C/3 rate for 100 cycles. After 100 cycles the cell was further cycled at a wider state of charge (SOC) range of 60 to 20% at the same current density for 91 more cycles. The detailed charge/discharge curve for the arbitrarily chosen cycle at 196.6 hr is shown in FIG. 4. Analysis of this cycle data shows that a columbic efficiency of about 100% and an energy efficiency of 83.1%. The average Area Specific Resistance (ASR) normalized to membrane area for charge and discharge are 2.3V and 2.17V respectively.

Figure 5:
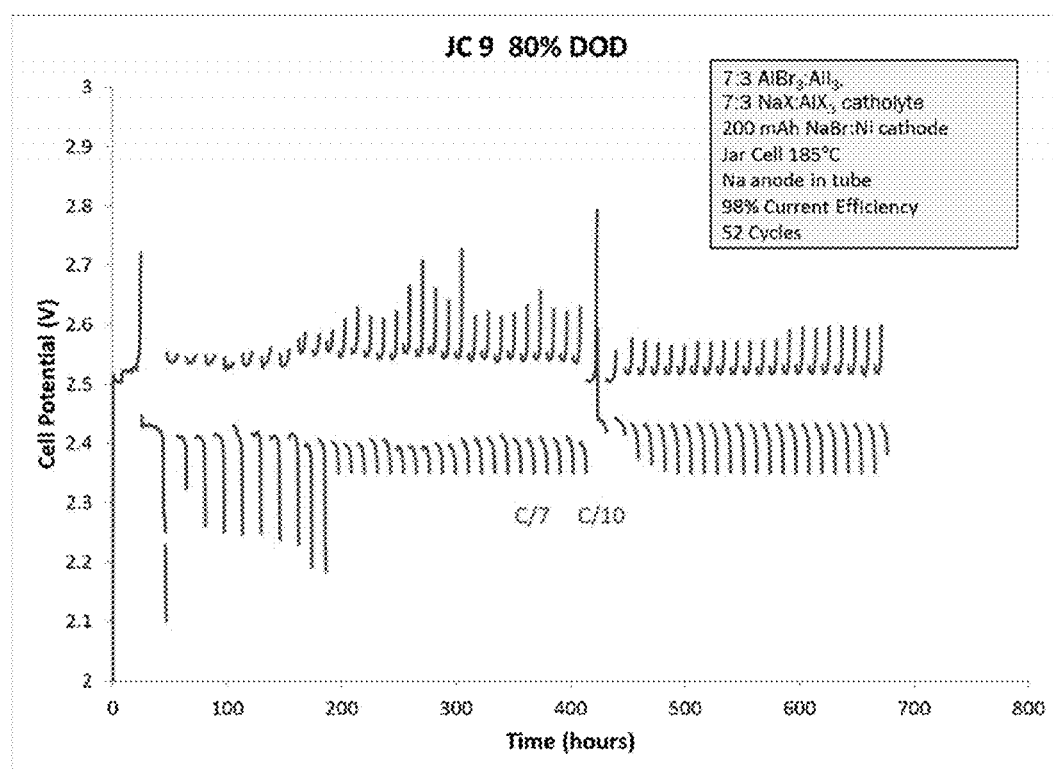
FIG. 5 shows the cycling behavior of a second sodium/nickel bromide cell constructed in the same manner as reported in relation to FIG. 3 except it was operated in a higher state of charge and higher depth of discharge.

A second cell was constructed in the same manner described above, and it was operated in a higher state of charge (SOC) range (90-10%), i.e. higher depth of discharge (about 80%) and the operating results data are shown in FIG. 5. The current efficiency of this cell was >98% over the 93+ cycles the cell has operated indicating practical columbic efficiency. The energy efficiency of both the example cells was in excess of 80%.

While specific embodiments and examples of the present invention have been illustrated and described, numerous modifications come to mind without significantly departing from the spirit of the invention, and the scope of protection is only limited by the scope of the accompanying claims.

The invention claimed is:

1. A rechargeable sodium battery comprising:
a negative electrode comprising metallic sodium in molten state;
a positive electrode comprising a mixture of NaX and MX, where X is a halogen selected from Cl, Br and I and M is a metal selected Ni, Fe, and Zn, wherein the positive electrode is disposed in a mixed molten salt positive electrolyte comprising at least two salts that can be represented by the formula NaAlX'$_{4-\delta}$X''$_\delta$, where 0<$\delta$<4, wherein X' and X'' are different halogens selected from Cl, Br and I; and
a sodium ion conductive solid electrolyte provided between the negative electrode and the positive electrode.

2. The rechargeable sodium battery of claim 1, wherein the mixed molten salt positive electrolyte comprises at least two salts of the general formula NaAlX'$_4$ and NaAlX''$_4$ at various molar ratios.

3. The rechargeable sodium battery of claim 2, wherein the molar ratio of NaAlX'$_4$ to NaAlX''$_4$ is in the range of 9:1 to 1:9 with corresponding $\delta$ values of 0.4 to 3.6.

4. The rechargeable sodium battery of claim 1, wherein the positive electrode comprises additional NaX or a mixture of NaX compounds added in a molar ratio to the mixed molten salt positive electrolyte ranging from 1:1 to 3:1 of NaX:NaAlX'$_{4-\delta}$X''$_\delta$.

5. The rechargeable battery of claim 4, wherein the positive electrode and mixed molten salt positive electrolyte is a molten liquid or a two phase mixture wherein the mixed molten salt positive electrolyte is predominantly a liquid phase and the additional NaX or mixture of NaX compounds is a solid phase.

6. The rechargeable sodium battery of claim 1, wherein the molten salt positive electrolyte comprises NaAlBr$_{2.8}$I$_{1.2}$.

7. The rechargeable sodium battery of claim 1, wherein the NaX comprises NaBr.

8. The rechargeable sodium battery of claim 1, wherein MX comprises NiBr.

9. The rechargeable sodium battery of claim 1, wherein the molten salt positive electrolyte comprises NaAlBr$_{2.8}$I$_{1.2}$, the NaX comprises NaBr, and the MX comprises NiBr.

10. The rechargeable sodium battery of claim 9, wherein the positive electrode comprises additional NaBr added in a molar ratio to the mixed molten salt positive electrolyte ranging from 1:1 to 3:1 of NaBr:NaAlBr$_{2.8}$I$_{1.2}$.

11. The rechargeable sodium battery of claim 10, wherein the sodium ion conductive solid electrolyte comprises a NaSICON electrolyte material.

12. The rechargeable sodium battery of claim 1, wherein the sodium ion conductive solid electrolyte comprises a NaSICON electrolyte material.

13. The rechargeable sodium battery of claim 1, wherein the battery operates at a temperature in the range from 160° C. to 220° C.

14. A rechargeable sodium battery comprising:
a negative electrode comprising metallic sodium in molten state;
a positive electrode comprising a mixture of NaX and MX, where X is a halogen selected from Cl, Br and I and M is a metal selected Ni, Fe, and Zn, wherein the positive electrode is disposed in a mixed molten salt positive electrolyte comprising at least three salts that can be represented by the formula NaAlX'$_{4-\delta-\overline{\omega}}$X''$_\delta$X'''$_{\overline{\omega}}$, where X', X'' and X''' are three different halogens selected from Cl, Br, and I, where 0<$\delta$<4, 0<$\overline{\omega}$<4, and 0<$\delta+\overline{\omega}$<4; and
a sodium ion conductive solid electrolyte provided between the negative electrode and the positive electrode.

15. The rechargeable sodium battery of claim 14, wherein the mixed molten salt positive electrolyte comprises NaAlCl$_4$, NaAlBr$_4$, and NaAlI$_4$, at various molar ratios.

16. The rechargeable sodium battery of claim 14, wherein the positive electrode comprises additional NaX or a mixture of NaX compounds added in a molar ratio to the mixed molten salt positive electrolyte ranging from 1:1 to 3:1 of $NaX:NaAlX'_{4-\delta-\bar{\omega}}X''_{\delta}X'''_{\bar{\omega}}$.

17. The rechargeable battery of claim 16, wherein the positive electrode and mixed molten salt positive electrolyte is a molten liquid or a two phase mixture wherein the mixed molten salt positive electrolyte is predominantly a liquid phase and the additional NaX or mixture of NaX compounds is a solid phase.

18. The rechargeable sodium battery of claim 16, wherein the sodium ion conductive solid electrolyte comprises a NaSICON electrolyte material.

19. The rechargeable sodium battery of claim 16, wherein the battery operates at a temperature in the range from 160° C. to 220° C.

20. The rechargeable sodium battery of claim 16, wherein the NaX comprises NaBr and MX comprises NiBr.

* * * * *